(12) United States Patent
Tagesson et al.

(10) Patent No.: US 11,975,727 B2
(45) Date of Patent: May 7, 2024

(54) AUTONOMOUS VEHICLE CONTROL SYSTEM

(71) Applicant: VOLVO TRUCK CORPORATION, Gothenburg (SE)

(72) Inventors: Kristoffer Tagesson, Karlstad (SE); Jonas Hagerskans, Landvetter (SE); Vinzenz Bandi, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 49 days.

(21) Appl. No.: 17/594,981

(22) PCT Filed: Jun. 4, 2019

(86) PCT No.: PCT/EP2019/064406
§ 371 (c)(1),
(2) Date: Nov. 4, 2021

(87) PCT Pub. No.: WO2020/244738
PCT Pub. Date: Dec. 10, 2020

(65) Prior Publication Data
US 2022/0315020 A1    Oct. 6, 2022

(51) Int. Cl.
*B60W 50/023* (2012.01)
*B60W 10/184* (2012.01)
*B60W 60/00* (2020.01)

(52) U.S. Cl.
CPC ........ *B60W 50/023* (2013.01); *B60W 10/184* (2013.01); *B60W 60/0015* (2020.02); *B60W 2510/18* (2013.01); *B60W 2520/04* (2013.01)

(58) Field of Classification Search
CPC ............. B60W 50/023; B60W 10/184; B60W 60/0015; B60W 2510/18; B60W 2520/04;
(Continued)

(56) References Cited

U.S. PATENT DOCUMENTS 7,610,121 B2 * 10/2009 Nishira ................. B60T 7/22
701/1
7,774,103 B2 * 8/2010 Deng ................. B60T 8/172
701/1
(Continued)

FOREIGN PATENT DOCUMENTS

CN    109562764 A    4/2019
CN    109606461 A    4/2019
(Continued)

OTHER PUBLICATIONS

International Search Report and Written Opinion dated Feb. 25, 2020 in corresponding International PCT Application No. PCT/EP2019/064406, 9 pages.
(Continued)

*Primary Examiner* — B M M Hannan
(74) *Attorney, Agent, or Firm* — Venable LLP; Jeffri A. Kaminski

(57) ABSTRACT

The present disclosure relates to an autonomous vehicle control system (100) for providing motion control of an autonomous vehicle (200), comprising: —a primary control unit (10) configured to perform longitudinal and lateral motion control of the vehicle during normal operation, —a secondary back-up control unit (20) configured to perform back-up longitudinal motion control when an emergency mode has been enabled, wherein the primary control unit is further configured to perform back-up lateral motion control when the emergency mode has been enabled. The invention further relates to a method for providing motion control of an autonomous vehicle and to an autonomous vehicle.

26 Claims, 4 Drawing Sheets

(58) Field of Classification Search
CPC ........... B60W 2540/215; B60W 10/04; B60W 10/182; B60W 10/20; B60W 30/143; B60W 60/00186; B60W 30/10; B60W 30/181; B60W 40/02; B60Y 2302/05; B60Y 2400/81

See application file for complete search history.

(56) References Cited

U.S. PATENT DOCUMENTS

| | | | | |
|---|---|---|---|---|
| 8,712,599 | B1* | 4/2014 | Westpfahl | B60R 21/0132 701/1 |
| 8,855,833 | B2* | 10/2014 | Kumabe | B60W 50/045 701/1 |
| 9,014,916 | B2* | 4/2015 | Tokimasa | B60W 50/045 701/41 |
| 9,180,862 | B2* | 11/2015 | Tokimasa | B60W 10/20 |
| 9,195,232 | B1 | 11/2015 | Egnor et al. | |
| 2005/0027402 | A1* | 2/2005 | Koibuchi | B60W 30/1819 701/1 |
| 2012/0109411 | A1* | 5/2012 | Tokimasa | B60W 10/184 701/1 |
| 2012/0109414 | A1* | 5/2012 | Kumabe | B60W 50/045 701/1 |
| 2012/0109460 | A1* | 5/2012 | Tokimasa | B60W 50/045 701/1 |
| 2013/0166101 | A1* | 6/2013 | Noumura | F02D 41/10 701/1 |
| 2014/0129090 | A1* | 5/2014 | Yamakado | B62D 15/029 701/41 |
| 2015/0185036 | A1* | 7/2015 | Braeuchle | G08G 1/096741 701/538 |
| 2018/0229738 | A1 | 8/2018 | Nilsson et al. | |
| 2018/0290642 | A1 | 10/2018 | Tschiene | |
| 2018/0348754 | A1 | 12/2018 | Samii et al. | |
| 2019/0009797 | A1 | 1/2019 | Liu et al. | |
| 2019/0100237 | A1 | 4/2019 | Klesing | |
| 2020/0369226 | A1* | 11/2020 | Ferencz | B60R 16/0232 |

FOREIGN PATENT DOCUMENTS

| | | | |
|---|---|---|---|
| CN | 114689344 A | * | 7/2022 |
| EP | 3421308 A1 | | 1/2019 |
| WO | 2017199967 A1 | | 11/2017 |

OTHER PUBLICATIONS

International Preliminary Report on Patentability dated Jul. 21, 2021 in corresponding International PCT Application No. PCT/EP2019/064406, 22 pages.
Japanese Office Action dated Apr. 18, 2023 in corresponding Japan Patent Application No. 2021-571658, 12 pages.
Chinese Office Action dated Jan. 23, 2024 in corresponding Chinese Patent Application No. 201980096376.8, 15 pages.

* cited by examiner

AUTONOMOUS VEHICLE CONTROL SYSTEM

CROSS-REFERENCE TO RELATED APPLICATIONS

This application is a U.S. National Stage application of PCT/EP2019/064406, filed Jun. 4, 2019, and published on Dec. 10, 2020, as WO 2020/244738 A1, all of which is hereby incorporated by reference in its entirety.

TECHNICAL FIELD

The invention relates to an autonomous vehicle control system for providing motion control of an autonomous vehicle. The invention furthermore relates to a method for providing motion control of an autonomous vehicle and to an autonomous vehicle comprising the vehicle control system.

The invention can be applied in heavy-duty vehicles, such as trucks, buses and construction equipment. Although the invention will be described with respect to heavy-duty trucks, the invention is not restricted to this particular vehicle, but may also be used in other vehicles such as light-weight trucks, articulated haulers, excavators, wheel loaders, and backhoe loaders.

BACKGROUND

Autonomous vehicle technology which concerns autonomous driving capabilities of autonomous vehicles is an area which has been evolving rapidly during recent years. It is likely that it will become increasingly common to see autonomous vehicles driving on public roads. It is also likely that it will be more common that commercial vehicles, such as trucks, buses, construction equipment vehicles etc. will have autonomous driving capabilities, which are adapted for public roads and/or for restricted areas.

One area of high importance is to provide robust autonomous vehicle control systems which have motion control redundancy. More particularly, if something in the vehicle fails which affects the vehicle's motion control capabilities during autonomous driving, it is of utmost importance that there are back-up systems which can take over the motion control and bring the vehicle to a safe stop.

One example of a redundant control system for an autonomous vehicle may be found in US 2018/0229738 A1, which according to its abstract discloses a safety stoppage device for an autonomous road vehicle having at least one control network and sensor, and an autonomous drive-control unit for processing sensor and communication signals and providing control signals for lateral and longitudinal control. A primary brake-control unit is configured to monitor the longitudinal control signals for faults and, upon determination of a fault, execute a longitudinal control profile, stored independent from the autonomous drive-control unit, to perform braking to a stop. A primary steering-control unit is configured to monitor the lateral control signals for faults and, upon determination of a fault, control a primary steering actuator to follow a lateral control trajectory, stored independent from the autonomous drive-control unit, and, if not already triggered, simultaneously trigger the primary brake-control unit to execute the stored longitudinal control profile to control wheel brakes to perform braking to a stop during execution of the lateral control trajectory Although the above described system provides motion control redundancy for an autonomous vehicle, it has been realized that it would be desirable to provide a more cost-efficient and robust system which does not compromise with vehicle safety.

According to its abstract, US 2019/009797 A1 relates to a system, method and apparatus for controlling an autonomous driving vehicle. A specific embodiment of the method comprises: periodically sending a heartbeat signal and/or communication data to a master control terminal device to determine whether the master control terminal device fails; and in response to determining a failure of the master control terminal device, acquiring data collected by a standby sensor, analyzing the data to generate a control instruction, and sending the generated control instruction to an electronic controller to enable the electronic controller to control the autonomous driving vehicle. The implementation improves the reliability of the autonomous driving vehicle.

According to its abstract, EP 3 421 308 A1 relates to a method performed by an autonomous vehicle for activating an autonomous braking maneuver of the autonomous vehicle having an autonomous drive system. The autonomous vehicle detects at least one user initiated request for an autonomous braking maneuver of the vehicle when the vehicle is in a first autonomous drive mode at a speed. The autonomous braking maneuver is at least one of: speed reduction or stop. When the request has been detected, the autonomous vehicle activates the autonomous braking maneuver of the vehicle which reduces the speed and/or brakes the vehicle to a stop.

SUMMARY

In view of the above, an object of the invention is to provide a robust and cost-efficient autonomous vehicle control system for motion control of an autonomous vehicle, or at least to provide a good alternative to already known autonomous vehicle control systems. Furthermore, an object of the invention is to provide an improved method for motion control of an autonomous vehicle and/or an autonomous vehicle comprising the vehicle control system.

According to a first aspect, the object is achieved by an autonomous vehicle control system according to claim 1. According to a second aspect, the object is achieved by a method according to claim 14. According to a third aspect, the object is achieved by an autonomous vehicle according to claim 26.

According to the first aspect thereof, the object is achieved by an autonomous vehicle control system for providing motion control of an autonomous vehicle, which comprises a primary control unit configured to perform longitudinal and lateral motion control of the vehicle during normal operation and a secondary back-up control unit configured to perform back-up longitudinal motion control when an emergency mode has been enabled. The primary control unit is further configured to perform back-up lateral motion control when the emergency mode has been enabled.

By the provision of the autonomous vehicle control system as disclosed herein, motion control redundancy can be achieved in a cost-efficient manner without compromising with safety. A general understanding is that all motion control components need to be duplicated for providing sufficient redundancy. This may however result in complex and complicated systems which also may be unnecessarily costly at least for certain types of autonomous vehicles. In view of this, the inventors have realized that at least for some types of autonomous vehicles, such as vehicles which are operating in confined areas, the autonomous vehicle control system configuration as disclosed herein will provide robust redundancy at a lower cost. More particularly, by introducing a back-up motion control in the primary control unit and a back-up longitudinal motion control in a separate secondary back-up control unit, the secondary back-up control unit can be a more simple control unit compared to if it would be configured to also perform back-up motion control. In addition, by performing the back-up motion control in the primary control unit, no additional separate control unit for lateral motion control is required. According to the invention, the back-up motion control is performed by a separate software module in the primary control unit, thereby providing software redundancy. Hence, the longitudinal motion control is achieved by hardware redundancy and the lateral motion control may be achieved by software redundancy in the primary control unit. Managing the lateral and longitudinal motion control redundancy in this manner is based on the understanding that it is more important to perform longitudinal motion control than lateral motion control during an emergency mode.

The expression "normal mode" as used herein means a mode of the vehicle in which motion control is performed by the primary control unit without any major hardware and/or software faults detected, and optionally also when no emergency request has been provided.

The expression "emergency mode" as used herein means a mode of the vehicle which is not the normal mode of the vehicle, and in which a hardware and/or software fault has been detected, and/or when an emergency request has been provided. According to an embodiment, the emergency request may be provided by pushing an emergency button, or the like. The emergency button, or the like, may be provided on the vehicle and/or at a location remote from the vehicle, such as in a back-office central, which may communicate wirelessly with the vehicle.

The expression "longitudinal motion control" as used herein means motion control of the vehicle in a longitudinal direction of the vehicle. Typically, longitudinal motion control may comprise braking control and/or propulsion control, and be performed by controlling braking actuators and/or by controlling propulsion means.

The expression "lateral motion control" as used herein means motion control of the vehicle in a lateral direction of the vehicle, such that the vehicle may follow a predetermined path. Typically, lateral motion control may be performed by controlling steering actuators or the like which control ground engaging means of the vehicle, such as wheels, so that the vehicle changes its lateral position during forward and/or backward driving. Just as a matter of example, lateral motion control may be performed by turning front and/or back wheels of a vehicle.

Optionally, the secondary back-up control unit may be configured to perform back-up longitudinal motion control without any lateral motion control, and preferably configured to only perform back-up longitudinal motion control. Thereby it can be assured that the secondary back-up control unit only needs to perform more simple computations, which in turn allows the control unit to be less complicated and less costly. Still optionally, the secondary back-up control unit may be configured to only perform braking control of the vehicle, thereby even further allowing use of a less complicated control unit configuration. Still optionally, the back-up longitudinal motion control performed during the emergency mode may be configured to bring the vehicle to a standstill. By for example having a secondary back-up control unit which is only configured to brake and bring the vehicle to a standstill when the emergency mode is enabled high safety may be provided without the need of more complicated and complex system configurations. As a consequence of the reduced complexity, more robust and reliable longitudinal motion control can be provided in a cost-efficient manner.

Optionally, the secondary back-up control unit may be configured to provide a control signal comprising a request for braking the vehicle to at least one of a primary brake system of the vehicle and a secondary back-up brake system of the vehicle when the emergency mode has been enabled. Still optionally, the primary control unit may be configured to provide a control signal comprising a request for braking the vehicle only to a primary brake system of the vehicle. Thereby, less complexity may be achieved in that the primary control unit is only connected to the primary brake system whilst the secondary back-up control unit is connected to at least one of the primary brake system of the vehicle and the optional secondary back-up brake system of the vehicle. Providing a secondary back-up brake system of the vehicle may further improve longitudinal back-up motion control. Purely by way of example, the secondary back-up brake system may comprise a solenoid valve which is adapted to engage the brakes of the vehicle.

Optionally, the secondary back-up control unit may be configured to enable the emergency mode when at least one of the following signals is received by the secondary back-up control unit:
 a signal from the primary control unit which is indicative of a fault of the primary control unit,
 a signal indicative of that an emergency stop is requested.

Hence, according to a preferred embodiment, the secondary back-up control may be configured to enable the emergency mode. By the provision of the autonomous vehicle control system as disclosed herein, the secondary back-up control unit may be more robust than the primary control unit, and thereby improved motion control redundancy may be provided by enabling the emergency mode by the secondary back-up control unit, and not by the primary control unit, which likely requires a more complicated configuration. The signal indicative of that an emergency stop is requested may for example be created when an emergency button, or equivalent means, is engaged, which may be located on or remotely from the vehicle. The signal may for example also be created if another related system of the vehicle indicates that an emergency stop is required. For example, vehicle surrounding perception sensors may be unavailable for some reason, and this may trigger the signal indicative of that an emergency stop is requested.

Optionally, the primary control unit may be configured to provide a heartbeat signal to the secondary back-up control unit when the primary control unit is available, and wherein the secondary back-up control unit may be configured to enable the emergency mode when the heartbeat signal from the primary control unit is not received. The expression "heartbeat signal" as used herein may be defined as a periodic and/or continuous signal generated by hardware and/or software which is provided for indicating normal operation. In the case a heartbeat signal is no longer provided as expected, it is an indication that something may have failed. Providing a heartbeat signal from the primary control unit to the secondary back-up control unit in this manner may further improve the motion control redundancy, since the secondary back-up control unit will enable the emergency mode when the heartbeat signal is no longer provided as expected.

Optionally, the secondary back-up control unit may be configured to provide a signal relating to that the emergency mode is enabled, which signal is provided for initiating a braking request to at least one of a primary brake system of the vehicle and a secondary back-up brake system of the vehicle, and whereby the autonomous vehicle control system further comprises at least one of a connection for rerouting the signal back into the secondary back-up control unit and a connection for providing the signal to the primary control unit for informing the primary control unit that the emergency mode has been enabled. By rerouting the signal back into the secondary back-up control unit, any possible faults which may appear in the communication for initiating the braking request may be avoided. It has namely been realized that the secondary back-up control unit may fail in initiating the braking request, and rerouting the signal may avoid such failure. Hence, rerouting the signal may improve the motion control redundancy in a cost-efficient manner. In addition, by providing the signal to the primary control unit, the primary control unit may be informed that the emergency mode has been enabled, and based on this information, it may for example stop providing longitudinal braking requests to the primary brake system. Still further, in the case when the signal is provided to the primary control unit and also rerouted back into the secondary back-up control unit, the risk that both control units at the same time would not initiate a braking request is significantly reduced.

Optionally, the autonomous vehicle control system may further comprise a vehicle automation decision control unit, wherein the vehicle automation decision control unit is configured to provide longitudinal and lateral control commands to the primary control unit, which control commands are based on information received from vehicle surrounding perception sensors provided on the vehicle.

Optionally, the secondary back-up control unit may be configured to provide a signal relating to that the emergency mode is enabled, which signal is provided for initiating a braking request to at least one of a primary brake system of the vehicle and a secondary back-up brake system of the vehicle, and whereby the autonomous vehicle control system further comprises a connection for providing the signal to the vehicle automation decision control unit. The signal that the emergency mode is enabled to the vehicle automation decision control unit may be used for informing about the status of the system. This information may for example be used for initiating other actions, such as informing a back-office central that the vehicle has entered the emergency mode.

Optionally, the secondary back-up control unit may be configured to provide a heartbeat signal to the primary control unit and/or to the vehicle automation decision control unit, when the secondary back-up control unit is available. Hence, the heartbeat signal may be used for knowing that the secondary back-up control unit is available and ready to take over longitudinal motion control if required. In the event the heartbeat signal is not received, specific actions may be initiated, such as bringing the vehicle to a safe stop by the primary control unit, and/or informing a back-office central that the secondary back-up control unit is unavailable. This may e.g. trigger an action that the vehicle should return to a service center or the like.

Optionally, the secondary back-up control unit may be a programmable logic controller (PLC). Such a control unit is a simple and cost-efficient control unit which has been found to be suitable for providing reliable longitudinal back-up control without unnecessary and complicated computation means. Still optionally, the secondary back-up control unit may be adapted to only execute a braking request when the emergency mode is enabled. Thereby, by only having as few functions as possible in the secondary back-up control unit, the control unit can be made more robust, which in turn provides a more reliable motion control redundancy. As yet another example, in the event the secondary back-up control unit is a PLC, the PLC may be a "safety PLC" which is configured according to a predefined security class standard, which is robust and reliable in operation. For example, the "safety PLC" may be configured to meet the standard "IEC 61508—Functional Safety of Electrical/Electronic/Programmable Electronic Safety-related Systems".

According to the second aspect thereof, the object is achieved by a method for providing motion control of an autonomous vehicle, wherein the autonomous vehicle comprises an autonomous vehicle control system comprising a primary control unit for performing longitudinal and lateral motion control and a secondary back-up control unit for performing back-up longitudinal motion control during an emergency mode, the method comprising a step of performing longitudinal and lateral motion control of the vehicle by the primary control unit during normal operation, characterized in that the method further comprises the following steps:

performing back-up lateral motion control by the primary control unit when the emergency mode has been enabled, and performing back-up longitudinal motion control by the secondary back-up control unit, when the emergency mode has been enabled.

Advantages and effects provided by the second aspect of the invention are largely analogous to the advantages and effects as provided by the autonomous vehicle control system according to the embodiments of the first aspect of the invention. It shall also be noted that all embodiments of the second aspect of the invention are applicable to and combinable with all embodiments of the first aspect of the invention and vice versa.

Optionally, the step of performing back-up longitudinal motion control by the secondary back-up control unit may be performed without performing any lateral motion control, and may preferably only perform back-up longitudinal motion control.

Optionally, the step of performing back-up longitudinal motion control by the secondary back-up control unit may only perform braking control of the vehicle.

Optionally, the longitudinal motion control performed during the emergency mode may be configured to bring the vehicle to a standstill.

Optionally, the method may further comprise a step of providing a control signal by the secondary back-up control unit to at least one of a primary brake system of the vehicle and a secondary back-up brake system of the vehicle when the emergency mode has been enabled, wherein the control signal comprises a request for braking the vehicle.

Optionally, the method may further comprise a step of providing a control signal by the primary control unit during normal operation only to a primary braking system of the vehicle, wherein the control signal comprises a request for braking the vehicle.

Optionally, the method may further comprise a step of enabling the emergency mode when at least one of the following signals is received by the secondary back-up control unit:

a signal from the primary control unit which is indicative of a fault of the primary control unit, a signal indicative of that an emergency stop is requested.

Optionally, the method may further comprise a step of providing a heartbeat signal to the secondary back-up control unit by the primary control unit when the primary control unit is available, and enabling the emergency mode when the heartbeat signal from the primary control unit is not received by the secondary back-up control unit.

Optionally, the method may further comprise a step of providing a signal relating to that the emergency mode is enabled by the secondary back-up control unit, which signal is provided for initiating a braking request to at least one of a primary brake system of the vehicle and a secondary back-up brake system of the vehicle, and further rerouting the signal back into the secondary back-up control unit and/or providing the signal to the primary control unit for informing the primary control unit that the emergency mode has been enabled.

Optionally, the autonomous vehicle control system may further comprise a vehicle automation decision control unit, wherein the method may further comprise a step of providing longitudinal and lateral control commands to the primary control unit, which control commands are based on information received from vehicle surrounding perception sensors provided on the vehicle.

Optionally, the method may further comprise a step of providing a signal relating to that the emergency mode is enabled by the secondary back-up control unit, which signal is provided for initiating a braking request to at least one of a primary brake system of the vehicle and a secondary back-up brake system of the vehicle, and further providing the signal to the vehicle automation decision control unit Optionally, the method may further comprise a step of providing a heartbeat signal to the primary control unit and/or to the vehicle automation decision control unit when the secondary back-up control unit is available.

According to the third aspect thereof, the object is achieved by an autonomous vehicle comprising the autonomous vehicle control system according to any one of the embodiments of the first aspect of the invention.

Advantages and effects provided by the third aspect of the invention are largely analogous to the advantages and effects as provided by the autonomous vehicle control system according to the embodiments of the first aspect of the invention and the method according to the embodiments of the second aspect of the invention. It shall also be noted that all embodiments of the third aspect of the invention are applicable to and combinable with all embodiments of the first and second aspects of the invention and vice versa.

Optionally, the autonomous vehicle may be any one of a truck, a bus, a construction equipment vehicle or the like. Still optionally, the autonomous vehicle may be a road car, such as a passenger car.

BRIEF DESCRIPTION OF THE DRAWINGS

With reference to the appended drawings, below follows a more detailed description of embodiments of the invention cited as examples.

In the drawings.

Figure 1:
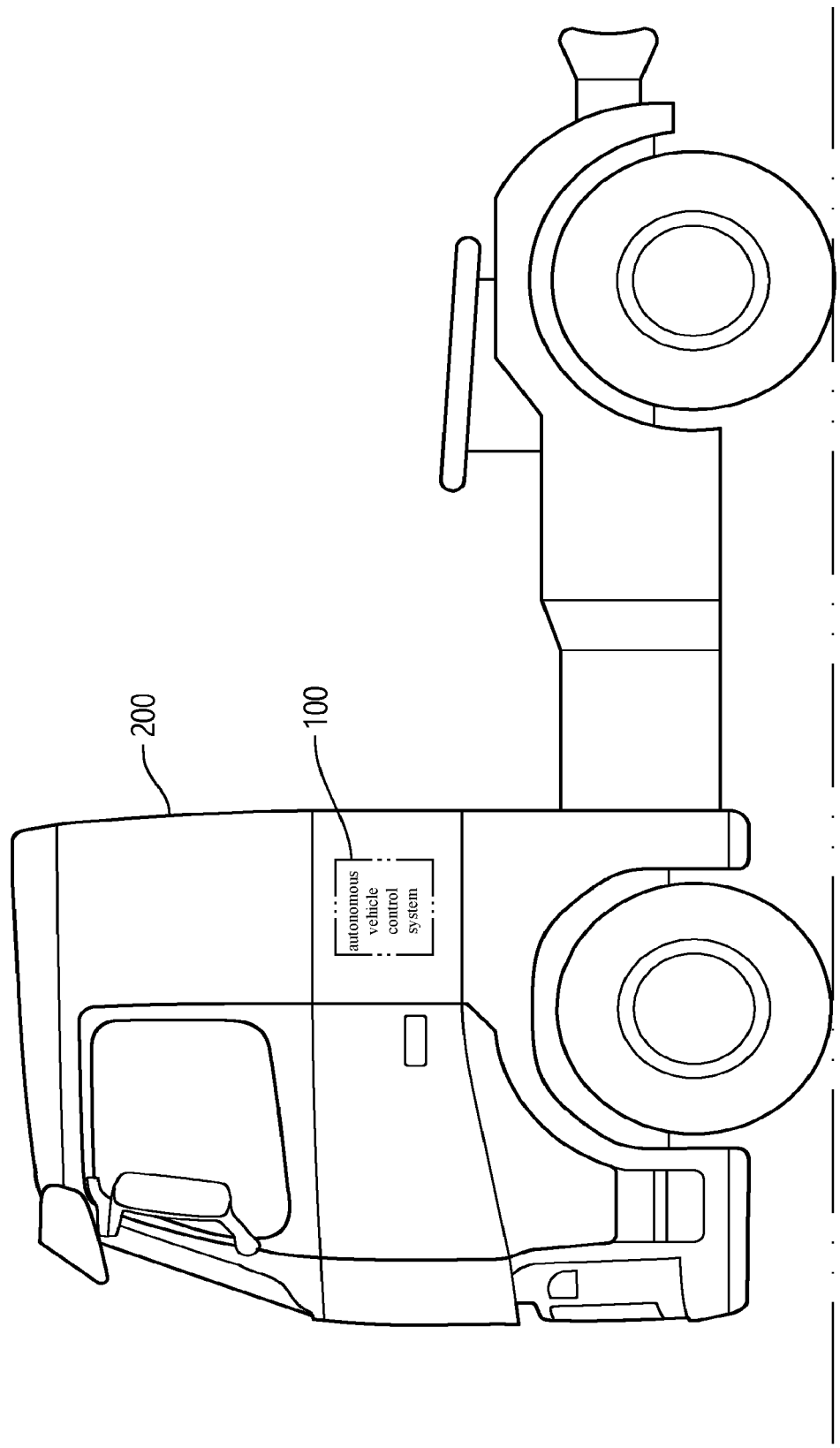
FIG. 1 shows an autonomous vehicle comprising an autonomous vehicle control system according to an embodiment of the present invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

FIG. 1 shows a side view of an autonomous truck 200 according to the third aspect of the invention, which here is a heavy-duty truck. The truck comprises an autonomous vehicle control system 100 according to the first aspect of the invention, which will be further described in the below with reference to FIGS. 2-4. The invention is applicable to any type of autonomous vehicle, including public road vehicles, but has shown to be particularly suitable for vehicles operating within confined areas, such as within logistics centers, harbours, construction areas, mining areas or the like. The inventors have namely realized that motion control redundancy may advantageously be implemented in a different manner for such vehicles and thereby achieve a reliable and robust motion control redundancy in a more cost-efficient manner. In fact, for such vehicles, a less strict redundancy requirement may be provided for the vehicle's lateral motion control, and the longitudinal back-up motion control may be improved by providing this back-up in a separate secondary control unit which is preferably configured to only provide the longitudinal back-up motion control.

Figure 2:
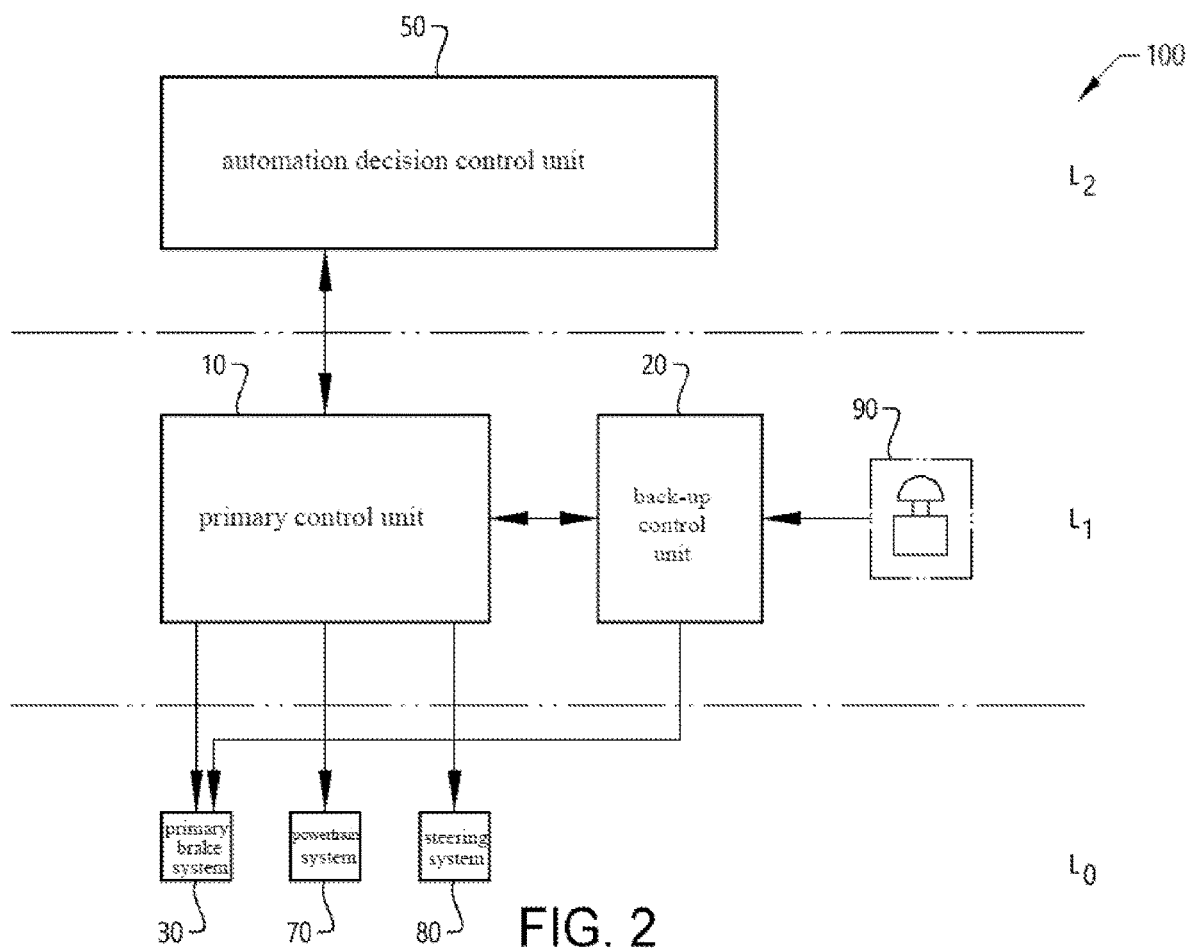
FIG. 2 shows a schematic view of an autonomous vehicle control system according to an embodiment of the present invention.

FIG. 2 shows a schematic illustration of an embodiment of an autonomous vehicle control system 100 architecture for providing motion control of an autonomous vehicle. An autonomous vehicle control system may be separated into a plurality of layers L0-L2. For example, the layer L0 may comprise a steering system 80, a primary brake system 30 and a powertrain system 70. The steering system 80 may preferably comprise trajectory control entities (not shown), such as steering actuators for providing lateral motion control of the vehicle 200. The primary brake system 30 may comprise longitudinal control entities (not shown), such as braking actuators. The primary brake system 30 may for example be a hydraulic or a pneumatic brake system. The powertrain system 70 may comprise an internal combustion engine (ICE) for providing propulsion of the vehicle. The powertrain system 70 may of course comprise other means for providing power, such as by electrical power and by combinations of electrical power and an ICE, i.e. a hybrid system.

The layer L1 in FIG. 2 may be denoted a "vehicle motion and power management layer". This layer comprises a primary control unit 10 configured to perform longitudinal and lateral motion control of the vehicle during normal operation. Further, the layer L1 comprises a secondary back-up control unit 20 configured to perform back-up longitudinal motion control when an emergency mode has been enabled. The primary control unit 10 is further configured to perform back-up lateral motion control when the emergency mode has been enabled. The emergency mode may for example be enabled by providing an emergency request, which may be provided by pushing on an emergency button 90 which is connected to the secondary back-up control unit 20.

The primary control unit 10 and the secondary back-up control unit 20 of the vehicle motion and power management layer L1 are configured to provide control requests to the systems of the layer L0. More particularly, the primary control unit 10 is configured to provide longitudinal brake control requests to the primary brake system 30 during normal operation of the vehicle 200, as indicated by the arrow therebetween in FIG. 2. The primary control unit 10 is further configured to provide lateral control requests to the steering system 80 and longitudinal powertrain requests to the powertrain system 70 during normal operation, as indicated by the arrows therebetween in FIG. 2. As can be further seen in FIG. 2, the secondary back-up control unit 20 is configured to provide longitudinal brake requests to the brake system 30, which is done when the emergency mode is enabled, e.g. the emergency button 90 has been engaged. Whilst the emergency mode is enabled, the primary control unit 10 will preferably stop performing any longitudinal brake requests to the brake system 30. This may be stopped in that the secondary back-up control unit provides a signal to the primary control unit 10 which is indicative of that the emergency mode is enabled. Hence, the primary control unit 10 and the secondary back-up control unit 20 are communicatively connected to each other, whereby signals may be provided in both directions therebetween. However, during the emergency mode, the primary control unit 10 is configured to provide lateral back-up motion control. The lateral back-up motion control will be enabled when the primary control unit receives the signal from the secondary back-up control unit, which signal is indicative of that the emergency mode is enabled. The lateral back-up motion control is preferably performed in a separate software module of the primary control unit 10, thereby providing sufficient and reliable lateral back-up control.

The primary control unit 10 may include a microprocessor, microcontroller, programmable digital signal processor or another programmable device. The primary control unit 10 may also, or instead, include an application specific integrated circuit, a programmable gate array or programmable array logic, a programmable logic device, or a digital signal processor. Where the primary control unit 10 includes a programmable device such as the microprocessor, microcontroller or programmable digital signal processor mentioned above, the processor may further include computer executable code that controls operation of the programmable device. The primary control unit 10 may comprise embedded hardware, sometimes with integrated software, where the hardware show close physical relationship. Examples of physical relationships are: shared casing and components mounted on one or several circuit boards. The secondary back-up control unit 20 may also include a microprocessor, microcontroller, programmable digital signal processor or another programmable device. The secondary back-up control unit 20 may also, or instead, include an application specific integrated circuit, a programmable gate array or programmable array logic, a programmable logic device, or a digital signal processor. Where the secondary back-up control unit 20 includes a programmable device such as the microprocessor, microcontroller or programmable digital signal processor mentioned above, the processor may further include computer executable code that controls operation of the programmable device. The secondary back-up control unit 20 may comprise embedded hardware, sometimes with integrated software, where the hardware show close physical relationship. Examples of physical relationships are: shared casing and components mounted on one or several circuit boards. The secondary back-up control unit 20 is preferably a less complicated, and hence more robust, control unit compared to the primary control unit 10, which preferably is a more advanced control unit. Purely by way of example, the secondary back-up control unit may be a PLC, as mentioned in the above.

Figure 3:
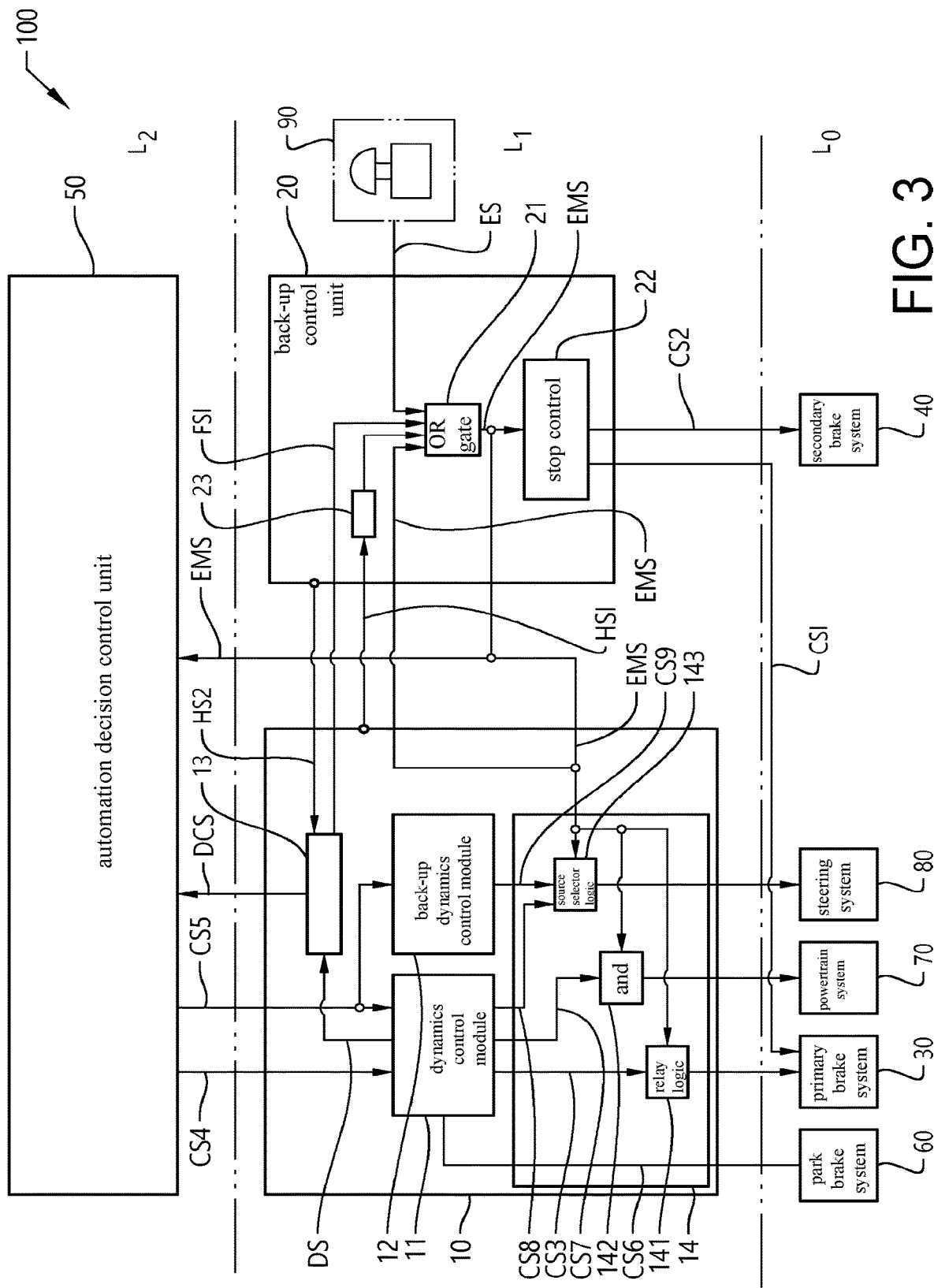
FIG. 3 shows a schematic view of another autonomous vehicle control system according to an embodiment of the present invention.

The primary control unit 10 and the secondary back-up control unit 20 as shown in FIGS. 2 and 3 are separated such that they don't share any common hardware components. It shall be noted that the primary control unit 10 may be formed by one or more connected sub control units, or equivalent computer resources, and the secondary back-up control unit 20 may also be formed by one or more connected sub control units, or equivalent computer resources. However, as stated in the above, the primary control unit 10 and the secondary back-up control unit 20 as shown are separated such that they don't share any common hardware components.

As can be further seen in the embodiment shown in FIG. 2, the autonomous vehicle control system 100 may also comprise a layer L2 which comprises a vehicle automation decision control unit 50, which is configured to provide longitudinal and lateral control commands to the primary control unit 10, which control commands are based on information received from vehicle surrounding perception sensors (not shown) provided on the vehicle 200. The layer L2 may be denoted a "Traffic situation management layer", and adapted for making decisions about vehicle short term trajectory, for example up to 5 to 10 seconds ahead during operation. In addition to provide control commands based on information received from vehicle surrounding perception sensors, also other information sources may be used, such as geolocation means, which may be GPS, Glonass™, Galileo™ and likewise solutions. Purely by way of example, the vehicle surrounding perception sensors may be in the form of cameras, LIDAR (Light Detection and Ranging) and RADAR (Radio Detection and Ranging) systems.

The vehicle automation decision control unit 50 may include a microprocessor, microcontroller, programmable digital signal processor or another programmable device. The vehicle automation decision control unit 50 may also, or instead, include an application specific integrated circuit, a programmable gate array or programmable array logic, a programmable logic device, or a digital signal processor. Where the vehicle automation decision control unit 50 includes a programmable device such as the microprocessor, microcontroller or programmable digital signal processor mentioned above, the processor may further include computer executable code that controls operation of the programmable device. The vehicle automation decision control unit 50 may comprise embedded hardware, sometimes with integrated software, where the hardware show close physical relationship. Examples of physical relationships are: shared casing and components mounted on one or several circuit boards.

As can be further seen from the embodiment in FIG. 2, the vehicle automation decision control unit 50 is not directly connected to the secondary back-up control unit 20. This provides a simplified system architecture, which also reduces the risk of faults occurring therein. It shall however be mentioned that in some embodiments the secondary back-up control unit 20 may be directly connected to the vehicle automation decision control unit 50 such that it can provide a signal to the vehicle automation decision control unit 50, which signal is indicative of that the emergency mode is enabled. Hence, it may be a one-way direct communication link therebetween, where only signals from the secondary back-up control unit 20 may be provided to the vehicle automation decision control unit 50, and not vice versa. The provided signal may for example be used for informing the layer L2 that the emergency mode has been enabled. This information may for example be used for informing a remote back-office central (not shown) that the vehicle is in the emergency mode and that it will or has been brought to a standstill.

FIG. 3 shows another embodiment of an autonomous vehicle control system 100 according to the invention, where especially the primary control unit 10 and the secondary back-up control unit 20 are shown in more detail. This system is also divided into three system layers L0-L2 in a similar manner as described with reference to FIG. 2. The layer L0 comprises a primary brake system 30, a powertrain system 70 and a steering system 80 in a similar manner as described with reference to FIG. 2. It further comprises a park brake system 60 and a secondary brake system 40, whereby the secondary brake system 40 is a back-up system to the primary brake system 30, and may for example be configured by a solenoid valve which is connected to a hydraulic or pneumatic brake circuit (not shown) of the primary brake system 30. By activating the solenoid valve, the brakes of the vehicle 200 may be engaged such that the vehicle 200 is brought to a standstill when the emergency mode is enabled.

The primary control unit 10 as shown in FIG. 3 may comprise a default longitudinal and lateral dynamics control module 11 and a back-up lateral dynamics control module 12, whereby the back-up lateral dynamics control module 12 is preferably a separate software module in the primary control unit 10, thereby providing software redundancy.

The primary control unit 10 may further comprise a diagnostics aggregation module 13 which is configured for receiving a signal DS indicative of a fault from the default longitudinal and lateral dynamics control module 11 and/or a heartbeat signal HS2 from the secondary back-up control unit 20. The diagnostics aggregation module 13 may further be configured to provide a status signal DCS to the vehicle automation decision control unit 50 for informing about an identified fault when the signal DS has been received and/or when the heartbeat signal HS2 is not received. In addition, the diagnostics aggregation module 13 may further be configured to provide a fault signal FS1 to the secondary back-up control unit 20 when the signal DS has been received and/or when the heartbeat signal HS2 is not received.

The primary control unit 10 may further comprise an arbitration module 14 comprising relay logic and source selector logic. More particularly, the secondary back-up control unit 20 is here configured to provide a signal EMS relating to that the emergency mode is enabled, which signal is provided for initiating a braking request CS1 and/or CS2 to at least one of the primary brake system 30 of the vehicle 200 and the secondary back-up brake system 40 of the vehicle 200, and whereby the vehicle control system 100 further comprises a connection for providing the signal EMS to the arbitration module 14 of the primary control unit 10 for informing the primary control unit 10 that the emergency mode has been enabled. The signal EMS may be provided to relay logic 141 and relay logic 142, and to source selector logic 143. When the signal EMS is provided to the relay logic 141, a brake system request signal CS3, which is provided to the primary brake system 30 during normal operation, is stopped at the relay logic 141 since the emergency mode now is enabled. Instead, the brake request signal CS1 is provided by the secondary back-up control unit 20 to the primary brake system 30. The signal CS1 controls the brakes of the vehicle 200 to engage and thereby the vehicle 200 will be brought to standstill in a safe and swift manner. The EMS signal may also be provided to the relay logic 142 for stopping a powertrain request signal CS7 from being provided to the powertrain system 70. Still further, the EMS signal may also be provided to the source selector logic 143, which upon receiving the EMS signal allows a steering request signal CS9 from the back-up lateral dynamics control module 12 to be provided to the steering system 80, instead of a steering system request CS8 from the default longitudinal and lateral dynamics control module.

In addition, or as an alternative, the EMS signal may be rerouted back into the secondary back-up control unit 20. It has namely been realized that a possible scenario could be that the primary control unit 10 believes that the secondary back-up control unit 20 has "taken over" the longitudinal motion control whilst the secondary back-up control unit 20 for some reason has failed in providing a brake request signal CS1 and/or CS2 to the primary brake system 30 and/or to the secondary brake system 40. Hence, by rerouting the EMS signal, this type of miscommunication between the units 10 and 20 may be avoided, resulting in a safer and more robust configuration. In addition, or as an alternative, the EMS signal may also be provided to the vehicle automation decision control unit 50 as described with reference to FIG. 2. In an alternative embodiment, the EMS signal may be provided to another relay logic (not shown) for also stopping the signal CS6 from being provided to the park brake system 60 when the emergency mode is enabled.

The vehicle automation decision control unit 50, which may be configured in a similar manner as described with reference to FIG. 2, is configured to provide longitudinal and lateral control commands CS4 and CS5 to the default longitudinal and lateral dynamics control module 11 and to the back-up lateral dynamics control module 12 of the primary control unit 10, which control commands are based on information received from vehicle surrounding perception sensors provided on the vehicle 200. The signal CS4 comprises longitudinal control commands and the signal CS5 comprises lateral control commands, and is provided to the default longitudinal and lateral dynamics control module 11 and to the back-up lateral dynamics control module 12, whilst the signal CS4 is only provided to the default longitudinal and lateral dynamics control module 11.

The park brake system 60 as shown in FIG. 3 is configured to receive a parking brake request signal CS6 from the default longitudinal and lateral dynamics control module 11.

The secondary back-up control unit 20, which preferably is a less complicated control unit compared to the primary control unit 10, such as a PLC, may comprise a decoder 23, an OR gate 21 and an emergency stop control module 22. The OR gate 21 is configured to receive different signals, such as the fault signal FS1 from the primary control unit 10, the rerouted EMS signal, a signal from the decoder 23 when a heartbeat signal HS1 from the primary control unit 10 is not received and an emergency request signal ES from e.g. an activated emergency button 90. When any one of the aforementioned signals are received by the OR gate 21, the emergency mode enabled signal EMS is provided therefrom. This signal is then provided to the emergency stop control module 22, which in turn provides the back-up brake request signals CS1 and CS2. Thereby, the brake request signals CS1 and/or CS2 will assure that the vehicle is safely brought to standstill when the emergency mode is enabled.

Figure 4:
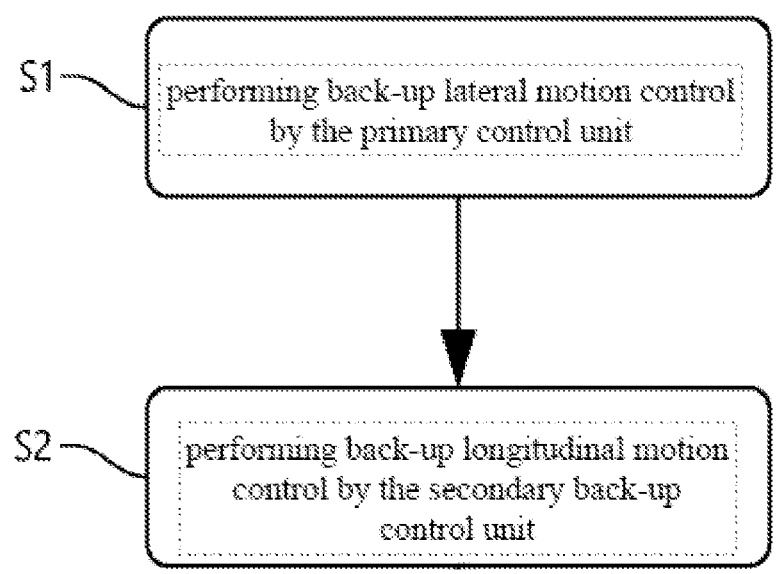
FIG. 4 shows a flowchart of a method according to an example embodiment of the present invention.

FIG. 4 shows a flowchart of an example embodiment of a method for providing motion control of an autonomous vehicle 200 according to the second aspect of the invention, wherein the autonomous vehicle 200 comprises an autonomous vehicle control system 100 comprising a primary control unit 10 for performing longitudinal and lateral motion control and a secondary back-up control unit 20 for performing back-up longitudinal motion control during an emergency mode. The method comprises a step of performing longitudinal and lateral motion control of the vehicle by the primary control unit 10 during normal operation. The method further comprises the following steps:

S1: performing back-up lateral motion control by the primary control unit when the emergency mode has been enabled, and S2: performing back-up longitudinal motion control by the secondary back-up control unit, when the emergency mode has been enabled.

It is to be understood that the present invention is not limited to the embodiments described above and illustrated in the drawings; rather, the skilled person will recognize that many changes and modifications may be made within the scope of the appended claims.

The invention claimed is:

1. An autonomous vehicle control system for providing motion control of an autonomous vehicle, comprising:
a primary control unit configured to perform longitudinal motion control and lateral motion control of the autonomous vehicle during normal operation,
a secondary back-up control unit configured to perform back-up longitudinal motion control when an emergency mode has been enabled, wherein
the primary control unit is further configured to perform back-up lateral motion control when the emergency mode has been enabled, wherein the primary control unit stores
computer program code for performing the longitudinal motion control and the lateral motion control when the program code is executed by the primary control unit, and
a separate module of computer program code for performing the back-up lateral motion control when the program code is executed by the primary control unit.

2. The autonomous vehicle control system according to claim 1, wherein the secondary back-up control unit is configured to perform back-up longitudinal motion control without any lateral motion control.

3. The autonomous vehicle control system according to claim 1, wherein the secondary back-up control unit is configured to only perform braking control of the vehicle.

4. The autonomous vehicle control system according claim 1, wherein the back-up longitudinal motion control performed during the emergency mode is configured to bring the vehicle to a standstill.

5. The autonomous vehicle control system according to claim 1, wherein the secondary back-up control unit is configured to provide a control signal comprising a request for braking the vehicle to at least one of a primary brake system of the vehicle and a secondary back-up brake system of the vehicle when the emergency mode has been enabled.

6. The autonomous vehicle control system according to claim 1, wherein the primary control unit during normal operation is configured to provide a control signal comprising a request for braking the vehicle only to a primary brake system of the vehicle.

7. The autonomous vehicle control system according to claim 1, wherein the secondary back-up control unit is configured to enable the emergency mode when at least one of the following signals is received by the secondary back-up control unit:
a signal from the primary control unit which is indicative of a fault of the primary control unit,
a signal indicative of that an emergency stop is requested.

8. The autonomous vehicle control system according to claim 1, wherein the primary control unit is configured to provide a heartbeat signal to the secondary back-up control unit when the primary control unit is available, and wherein the secondary back-up control unit is configured to enable the emergency mode when the heartbeat signal from the primary control unit is not received.

9. The autonomous vehicle control system according to claim 1, wherein the secondary back-up control unit is configured to provide a signal relating to that the emergency mode is enabled, which signal is provided for initiating a braking request to at least one of a primary brake system of the vehicle and a secondary back-up brake system of the vehicle, and whereby the vehicle control system further comprises at least one of a connection for rerouting the signal back into the secondary back-up control unit and a connection for providing the signal to the primary control unit for informing the primary control unit that the emergency mode has been enabled.

10. The autonomous vehicle control system according to claim 1, further comprising a vehicle automation decision control unit, wherein the vehicle automation decision control unit is configured to provide longitudinal and lateral control commands to the primary control unit, which control commands are based on information received from vehicle surrounding perception sensors provided on the vehicle.

11. The autonomous vehicle control system according to claim 10, wherein the secondary back-up control unit is configured to provide a signal relating to that the emergency mode is enabled, which signal is provided for initiating a braking request to at least one of a primary brake system of the vehicle and a secondary back-up brake system of the vehicle, and whereby the vehicle control system further comprises a connection for providing the signal to the vehicle automation decision control unit.

12. The autonomous vehicle control system according to claim 1, wherein the secondary back-up control unit is configured to provide a heartbeat signal to the primary control unit and/or to the vehicle automation decision control unit, when the secondary back-up control unit is available.

13. The autonomous vehicle control system according to claim 1, wherein the secondary back-up control unit is a programmable logic controller.

14. A method for providing motion control of an autonomous vehicle, wherein the autonomous vehicle comprises an autonomous vehicle control system comprising a primary control unit for performing longitudinal and lateral motion control, the primary control unit storing computer program code for performing the longitudinal motion control and the lateral motion control, and a separate module of computer program code for performing back-up lateral motion control, and a secondary back-up control unit for performing back-up longitudinal motion control during an emergency mode, the method comprising a step of performing longitudinal and lateral motion control of the vehicle by the primary control unit during normal operation when the computer program code for performing the longitudinal motion control and the lateral motion control is executed by the primary control unit, performing back-up lateral motion control by the primary control unit when the emergency mode has been enabled when the separate module of computer program code for performing back-up lateral motion control is executed by the primary control unit, and performing back-up longitudinal motion control by the secondary back-up control unit, when the emergency mode has been enabled.

15. The method according to claim 14, wherein the step of performing back-up longitudinal motion control by the secondary back-up control unit is performed without performing any lateral motion control.

16. The method according to claim 14, wherein the step of performing back-up longitudinal motion control by the secondary back-up control unit is only performing braking control of the vehicle.

17. The method according to claim 14, wherein the longitudinal motion control performed during the emergency mode is configured to bring the vehicle to a standstill.

18. The method according to claim 15, further comprising a step of providing a control signal by the secondary back-up control unit to at least one of a primary brake system of the vehicle and a secondary back-up brake system of the vehicle when the emergency mode has been enabled, wherein the control signal comprises a request for braking the vehicle.

19. The method according to claim 14, further comprising a step of providing a control signal by the primary control unit during normal operation only to a primary braking system of the vehicle, wherein the control signal comprises a request for braking the vehicle.

20. The method according to claim 14, further comprising a step of enabling the emergency mode when at least one of the following signals is received by the secondary back-up control unit:
   a signal from the primary control unit which is indicative of a fault of the primary control unit,
   a signal indicative of that an emergency stop is requested.

21. The method according to claim 14, further comprising a step of providing a heartbeat signal to the secondary back-up control unit by the primary control unit when the primary control unit is available, and enabling the emergency mode when the heartbeat signal from the primary control unit is not received by the secondary back-up control unit.

22. The method according to claim 14, further comprising a step of providing a signal relating to that the emergency mode is enabled by the secondary back-up control unit, which signal is provided for initiating a braking request to at least one of a primary brake system of the vehicle and a secondary back-up brake system of the vehicle, and further rerouting the signal back into the secondary back-up control unit and/or providing the signal to the primary control unit for informing the primary control unit that the emergency mode has been enabled.

23. The method according to claim 14, wherein the autonomous vehicle control system further comprises a vehicle automation decision control unit, and wherein the method further comprises a step of providing longitudinal and lateral control commands to the primary control unit, which control commands are based on information received from vehicle surrounding perception sensors provided on the vehicle.

24. The method according to claim 23, further comprising a step of providing a signal relating to that the emergency mode is enabled by the secondary back-up control unit, which signal is provided for initiating a braking request to at least one of a primary brake system of the vehicle and a secondary back-up brake system of the vehicle, and further providing the signal to the vehicle automation decision control unit.

25. The method according to claim 14, further comprising a step of providing a heartbeat signal to the primary control unit and/or to the vehicle automation decision control unit when the secondary back-up control unit is available.

26. An autonomous vehicle comprising an autonomous vehicle control system for providing motion control of an autonomous vehicle, comprising:
   a primary control unit configured to perform longitudinal motion control and lateral motion control of the autonomous vehicle during normal operation,
   a secondary back-up control unit configured to perform back-up longitudinal motion control when an emergency mode has been enabled, wherein
   the primary control unit is further configured to perform back-up lateral motion control when the emergency mode has been enabled, wherein the primary control unit stores
   computer program code for performing the longitudinal motion control and the lateral motion control when the program code is executed by the primary control unit, and
   a separate module of computer program code for performing the back-up lateral motion control when the program code is executed by the primary control unit.

* * * * *